US009207458B2

(12) United States Patent
Zhang et al.

(10) Patent No.: US 9,207,458 B2
(45) Date of Patent: Dec. 8, 2015

(54) BACKLIGHT DRIVING BOARD AND LCD DEVICE

(71) Applicant: Shenzhen China Star Optoelectronics Technology Co., Ltd., Shenzhen, Guangdong (CN)

(72) Inventors: Hua Zhang, Shenzhen (CN); Xianming Zhang, Shenzhen (CN); Xiang Yang, Shenzhen (CN)

(73) Assignee: Shenzhen China Star Optoelectronics Technology Co., Ltd, Shenzhen, Guangdong ( * ) Notice: Subject to any disclaimer, the term of this patent is extended or adjusted under 35 U.S.C. 154(b) by 185 days.

(21) Appl. No.: 13/877,334

(22) PCT Filed: Mar. 27, 2013

(86) PCT No.: PCT/CN2013/073252

§ 371 (c)(1),
(2) Date: Apr. 2, 2013

(87) PCT Pub. No.: WO2014/146308

PCT Pub. Date: Sep. 25, 2014

(65) Prior Publication Data

US 2014/0333859 A1 Nov. 13, 2014

(30) Foreign Application Priority Data

Mar. 20, 2013 (CN) .......................... 2013 1 0090176

(51) Int. Cl.
*G02B 27/22* (2006.01)
*H05B 33/08* (2006.01)

(52) U.S. Cl.
CPC .............. *G02B 27/22* (2013.01); *H05B 33/086* (2013.01); *H05B 33/0827* (2013.01)

(58) Field of Classification Search
CPC ....................................................... G02B 27/22
USPC ......... 315/210, 224–225, 246, 247, 250, 291, 315/307, 360; 345/87, 102, 211, 214
See application file for complete search history.

(56) References Cited

U.S. PATENT DOCUMENTS

| | | | | |
|---|---|---|---|---|
| 6,630,914 | B1 * | 10/2003 | Tamekuni et al. | 345/8 |
| 2004/0058715 | A1 * | 3/2004 | Taniguchi et al. | 455/566 |
| 2005/0231459 | A1 * | 10/2005 | Furukawa | 345/102 |
| 2008/0284349 | A1 * | 11/2008 | Weng | 315/291 |
| 2010/0220047 | A1 * | 9/2010 | Adachi | 345/102 |
| 2011/0291576 | A1 * | 12/2011 | Wong et al. | 315/210 |

* cited by examiner

*Primary Examiner* — Shaheda Abdin
(74) *Attorney, Agent, or Firm* — Andrew C. Cheng

(57) ABSTRACT

The present invention discloses a backlight driving board for driving a backlight source, comprising a microprocessor and a constant current driver chip. The microprocessor receives a display mode switching signal and a synchronization signal from a liquid crystal driving board, and generating a first pulse width modulation signal corresponding to the backlight source according to the display mode switching signal and the synchronization signal. The constant current driver chip controls an operation state of the backlight source according to the first pulse width modulation signal. The present invention can reduce the signal lines between the backlight driving board and the liquid crystal driving board in order to avoid the backlight driving board from external interference because of too many signal lines, and thus be able to enhance the stability of the LCD device when operating.

11 Claims, 2 Drawing Sheets

BACKLIGHT DRIVING BOARD AND LCD DEVICE

BACKGROUND OF THE INVENTION

1. Field of the Invention

The present invention relates to a liquid crystal display field, and more particularly to a backlight driving board and a liquid crystal display device including the backlight driving board.

2. Description of Related Art

With the development of the science and technology, the liquid crystal display (LCD) device both has the 3D and 2D display function is more popular in people's daily life. Such type of LCD device comprises a liquid crystal driving board and a backlight driving board. The liquid crystal driving board controls the backlight source to emit light. The backlight driving board and the liquid crystal driving board requires strict synchronization in order to ensure a good viewing effect. The backlight driving board of the prior art includes a constant current driver chip. The constant current diver chip receives multiple control signals from the liquid crystal driving board, and the multiple control signals at least include a chip select signal, a clock signal, a data signal, a synchronization signal, common ground signal and a 3D/2D switching signal. Therefore, the control signals of the backlight driving board of the prior art are too many, and it easily causes poor operation stability because of the external interference. It requires providing a backlight driving board and an LCD device in order to solve the above problems.

SUMMARY OF THE INVENTION

The technical problem solved by the present invention is to provide a backlight driving board and an LCD device, which can reduce the signal lines between the backlight driving board and the liquid crystal driving board in order to avoid the backlight driving board from external interference because of too many signal lines, and thus be able to enhance the stability of the LCD device when operating.

In order to solve the above-mentioned technical problem, a technical solution provided by the present invention is: a backlight driving board for driving a backlight source, comprising: a microprocessor for receiving a display mode switching signal and a synchronization signal from a liquid crystal driving board, and generating a first pulse width modulation signal corresponding to the backlight source according to the display mode switching signal and the synchronization signal, and the backlight driving board and the liquid crystal driving board are connected to a common ground; and a constant current driver chip for controlling a duty ratio of a current flowing through the backlight source according to the first pulse width modulation signal.

Wherein, the constant current driver chip further receives the display mode switching signal and controls a magnitude of the current flowing through the backlight source.

Wherein, the constant current driver chip comprises a comparator and a first controlled switch corresponding to the backlight source, a positive input terminal of the comparator is connected to the display mode switching signal, and a negative input terminal of the comparator is connected to a first terminal of the first controlled switch and is grounded through a resistor, an output terminal of the comparator is connected to a control terminal of the first controlled switch, a second terminal of the first controlled switch is connected to a second end of the backlight source, and the control terminal of the first controlled switch is connected to the first pulse width modulation signal, the display mode switching signal generates different voltage values in different display modes at the positive input terminal of the comparator to control the magnitude of the current flowing through the backlight source.

Wherein, the backlight driving board further comprises a power supply module connected at a first end of the backlight source for providing power to the backlight source.

In order to solve the above-mentioned technical problem, another technical solution provided by the present invention is a backlight driving board for driving a backlight source, comprising; a microprocessor for receiving a display mode switching signal and a synchronization signal from a liquid crystal driving board, and generating a first pulse width modulation signal corresponding to the backlight source according to the display mode switching signal and the synchronization signal; and a constant current driver chip for controlling an operation state of the backlight source according to the first pulse width modulation signal.

Wherein, the constant current driver chip further receives the display mode switching signal and controls a duty ratio of a current flowing through the backlight source according to the first pulse width modulation signal.

Wherein, the constant current driver chip further receives the display mode switching signal and controls a magnitude of the current flowing through the backlight source.

Wherein, the constant current driver chip comprises a comparator and a first controlled switch respectively corresponding to the backlight source, a positive input terminal of the comparator is connected to the display mode switching signal, and a negative input terminal of the comparator is connected to a first terminal of the first controlled switch and is grounded through a resistor, an output terminal of the comparator is connected to a control terminal of the first controlled switch, a second terminal of the first controlled switch is connected to a second end of the backlight source, and the control terminal of the first controlled switch is connected to the first pulse width modulation signal, the display mode switching signal generates different voltage values in different display modes at the positive input terminal of the comparator to control the magnitude of the current flowing through the backlight source.

Wherein, the backlight driving board further comprises a power supply module connected at a first end of the backlight source for providing power to the backlight source.

Wherein, the power supply module includes an inductor, a second controlled switch, a rectifier diode and a capacitor, a first end of the inductor connecting to a power source voltage, a first terminal of the second controlled switch connecting to a second end of the inductor, a second terminal of the second controlled switch connecting to a ground, an anode electrode of the rectifier diode connecting to the second end of the inductor, a cathode electrode of the rectifier diode connecting to a first end of the backlight source, an end of the capacitor connecting to a location between the rectifier diode and the backlight source, the other end of the capacitor connecting to the ground, and a control terminal of the second controlled switch connects to a second pulse width modulation signal.

Wherein, the backlight source is an LED string, and a positive electrode of the LED string connects to the power supply module, and a negative electrode of the LED string connects to the second terminal of the second controlled switch.

Wherein, the backlight driving board and the liquid crystal driving board are formed with a common ground connection.

Wherein, the display mode switching signal is a 2D/3D switching signal.

In order to solve the above-mentioned technical problem, another technical solution provided by the present invention is: An LCD device comprising a liquid crystal driving board, a backlight source, and a backlight driving board, wherein, the backlight driving board comprises: a microprocessor for receiving a display mode switching signal and a synchronization signal from a liquid crystal driving board, and generating a first pulse width modulation signal corresponding to the backlight source according to the display mode switching signal and the synchronization signal; and a constant current driver chip for controlling an operation state of the backlight source according to the first pulse width modulation signal.

Wherein, the constant current driver chip further receives the display mode switching signal and controls a duty ratio of a current flowing through the backlight source according to the first pulse width modulation signal.

Wherein, the constant current driver chip further receives the display mode switching signal and controls a magnitude of the current flowing through the backlight source.

Wherein, the constant current driver chip comprises a comparator and a first controlled switch respectively corresponding to the backlight source, a positive input terminal oldie comparator is connected to the display mode switching signal, and a negative input terminal of the comparator is connected to a first terminal of the first controlled switch and is grounded through a resistor, an output terminal of the comparator is connected to a control terminal of the first controlled switch, a second terminal of the first controlled switch is connected to a second end of the backlight source, and the control terminal of the first controlled switch is connected to the first pulse width modulation signal, the display mode switching signal generates different voltage values in different display modes at the positive input terminal of the comparator to control the magnitude of the current flowing through the backlight source.

Wherein, the backlight driving board further comprises a power supply module connected at a first end of the backlight source for providing power to the backlight source.

Wherein, the power supply module includes an inductor, a second controlled switch, a rectifier diode and a capacitor, a first end of the inductor connecting to a power source voltage, a first terminal of the second controlled switch connecting to a second end of the inductor, a second terminal of the second controlled switch connecting to a ground, an anode electrode of the rectifier diode connecting to the second end of the inductor, a cathode electrode of the rectifier diode connecting to a first end of the backlight source, an end of the capacitor connecting to a location between the rectifier diode and the backlight source, the other end of the capacitor connecting to the ground, and a control terminal of the second controlled switch connects to a second pulse width modulation signal.

Wherein, the backlight source is an LED string, and a positive electrode of the LED string connects to the power supply module, and a negative electrode of the LED string connects to the second terminal of the second controlled switch.

The beneficial effect of the present invention is: comparing to the conventional art, the backlight driving board of the present invention controls the light emitting of the backlight sources by setting the microprocessor to generate pulse width modulation signals such that it is possible to reduce the signal lines between the backlight driving board and the liquid crystal driving board in order to avoid the backlight driving board from external interference because of too many signal lines, and thus be able to enhance the stability of the LCD device when operating.

DETAILED DESCRIPTION OF THE PREFERRED EMBODIMENT

The following content combines with the drawings and the embodiment for describing the present invention in detail.

Figure 1:
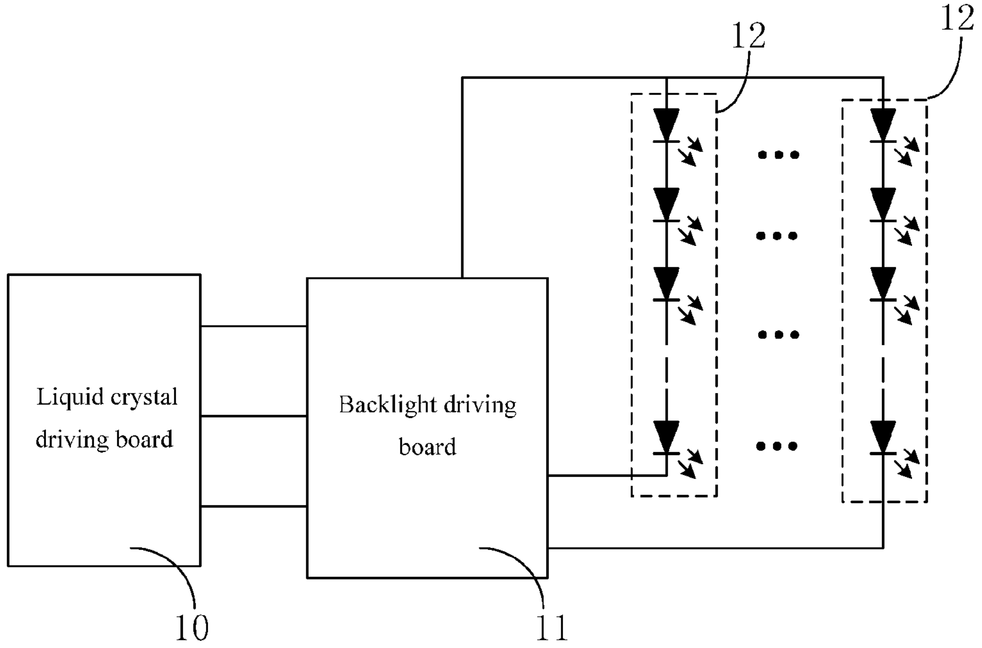
FIG. 1 is a schematic block diagram of an LCD device according to an embodiment of the present invention.

With reference to FIG. 1, FIG. 1 is a schematic block diagram of an LCD device according to an embodiment of the present invention. In the present embodiment, the LCD device preferably comprises a liquid crystal driving board 10, a backlight driving board 11 and multiple backlight sources 12. The liquid crystal driving board 10 is for controlling the deflection of the liquid crystal molecules in the liquid crystal panel (not shown) according to the display content. The backlight driving board 11 is used for controlling the light emitting of the backlight sources 12, and cooperates with the liquid crystal panel driven by the liquid crystal driving hoard 10 to complete different display effects. The LCD device require the liquid crystal driving board 10 and backlight driving board 11 to be strict synchronization in order to achieve a better display. Meanwhile, it is also required to control the backlight sources 12 to operate at different actions in accordance with different display modes.

In the present embodiment, the liquid crystal driving board 10 controls the light emitting of the backlight sources 12 through outputting a synchronization signal Vsync (shown in FIG. 2) and a display mode switching signal T (shown in FIG. 2) to the backlight driving board 11 in order to meet the demand for various types of display. Furthermore, the liquid crystal driving board 10 and the backlight driving board 11 form a common ground connection by a common ground line GND. It should be understood that the number of the backlight sources 12 in the present embodiment is multiple, and the backlight sources 12 are preferably LED strings. However, in other embodiment, the backlight sources 12 may be other light emitting elements. In the present embodiment, the display mode switching signal T is a 2/3D switching signal.

Figure 2:
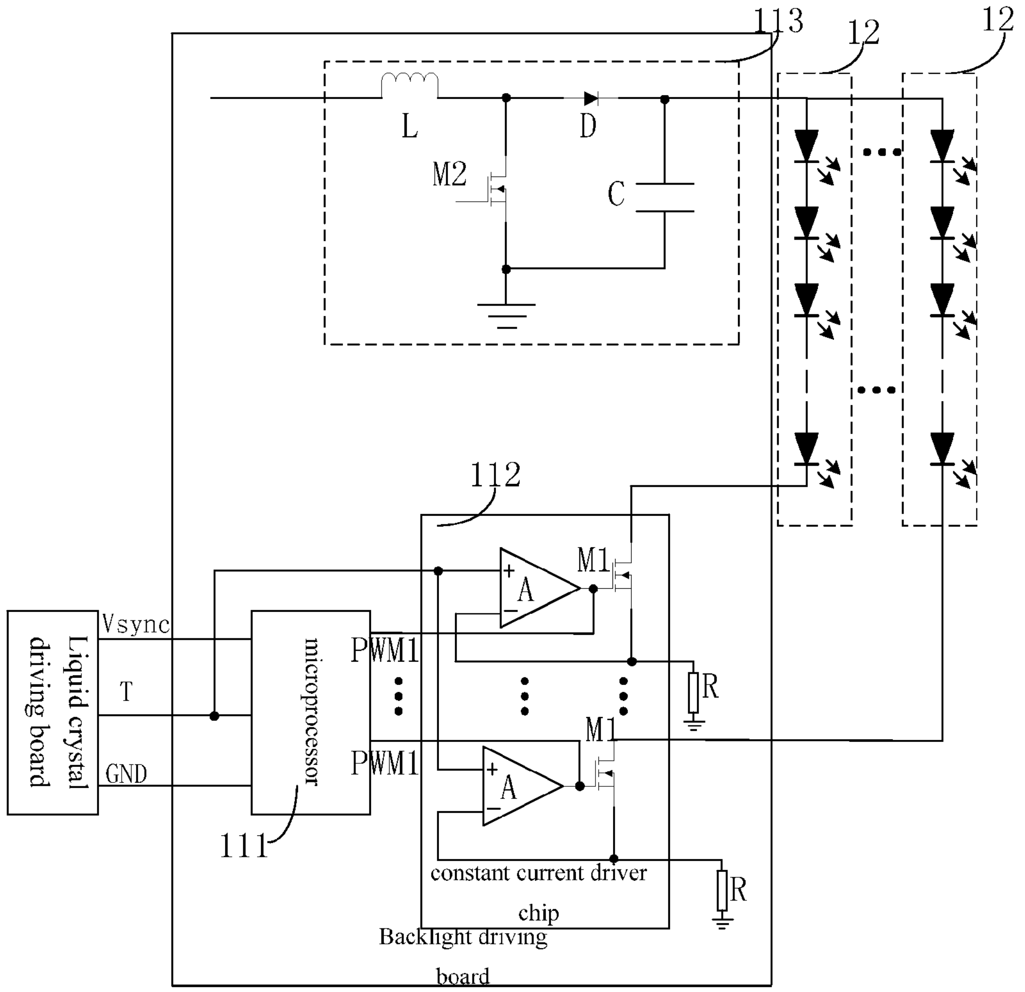
FIG. 2 is a schematic block diagram of a backlight driving board according to an embodiment of the present invention.

With further reference to FIG. 2, FIG. 2 is a schematic block diagram of the backlight driving board according to an embodiment of the present invention. The backlight driving board 11 preferably includes: a microprocessor 111, a constant current driver chip 112, a power supply module 114, and a resistor R.

The microprocessor 111 is used for receiving the display mode switching signal T and the synchronization signal Vsync from the liquid crystal driving hoard 10, and generating a first pulse width modulation signal PWM1-PWMn respectively corresponding to each backlight source 12 according to the display mode switching signal T and the synchronization signal Vsync. After the microprocessor 111 receives the display mode switching signal T, it calls the internal encoding program to output different first pulse width modulation signals PWM1 respectively in the 2D and 3D display mode. The microprocessor 111 connected to the liquid crystal driving board 10 by two signal lines. Between the microprocessor 111 and the liquid crystal driving board 10, it also connected with a common ground line GND. Therefore, between the liquid crystal driving board 10 and the microprocessor 111, that is, between the LCD driving board 10 and the backlight driving board 111, it only has three connection lines such that it can avoid external interference because of too many connection lines.

The constant current driver chip 112 includes comparators A, and the number of the comparators A is corresponding to the number of the backlight sources 12, and first controlled switches M1. A positive (non-inverting) input terminal of each comparator A is connected to the display mode switching signal T, and a negative (inverting) input terminal of each comparator A is connected to a first terminal of each first controlled switch M1 and is grounded through a resistor R. An output terminal of each comparator A is connected to a control terminal of each first controlled switch M1, a second terminal of each first controlled switch M1 is connected to a cathode of each backlight source 12, and the control terminal of each first controlled switch M1 is respectively connected to the first pulse width modulation signal PWM1-PWMn.

The display mode switching signal T generates different voltage values in different display modes at the positive input terminal of each comparator A to control a magnitude of a current flowing through each backlight source 12. The negative input terminal of each comparator a feedbacks a voltage V1 on the resistor R. Each comparator A compares the voltage V2 generated by the display mode switching signal T at the positive input terminal with the voltage V1 many times, and outputs different results to each first controlled switch M1. At the steady state, V1=V2. Through the foregoing method, it adjusts the magnitude of the current flowing through each backlight source 12. The magnitude of the current flows through the each backlight source 12 is different in the 2D display mode and the 3D display mode. By changing the voltage value, the display switching mode signal T can meet the requirement of the different magnitudes of the current of each backlight source 12. In the present embodiment, each first controlled switch M1 is preferably a NMOS transistor, the first terminal of each first controlled switch M1 is a drain electrode, the second terminal is a source electrode, the control terminal is a gate electrode, in other embodiments, each first controlled switch M1 can also be other components.

The constant current driver chip 112 also controls a duty ratio of the current flowing through each backlight source 12 according to the first pulse width modulation signal PWM1-PWMn. The first pulse width modulation signal PWM1-PWMn is a square wave signal generated by the microprocessor 111 in accordance with the display mode switching signal T and the synchronization signal Vsync. At high voltage level of the first pulse width signal PWM1-PWMn, the first pulse width signal PWM1-PWMn controls the first and the second terminal of each switch M1 to be conductive (turn on the switch M1) and to be cutoff at low voltage level. By the foregoing method, the first pulse width modulation signal PWM1-PWMn controls the duty ratio of the current flowing through each backlight source 12. The greater of the duty ratio, the average current flowing through each backlight source 12 is larger. The smaller of the duty ratio, the average current flowing through each backlight source 12 is smaller in order to control the purpose of controlling the light and dark reach backlight source 12. In the present embodiment, in the 3D mode, the duty ratio of the current of each backlight source 12 is fixed at 20%. In the 2D display mode, the duty ratio of the current can be arbitrarily adjusted. In other embodiments, a range of the duty ratio of the current of each backlight source 12 may also be other values.

The power supply module 113 preferably includes an inductor L, a second controlled switch M2, a rectifier diode D and a capacitor C. A first end of the inductor L connects to a power source voltage, a second end of the inductor L connects to a first terminal of the second controlled switch M2. A second terminal of the second controlled switch M2 connects to the ground. An anode electrode of the rectifier diode D connects to the second end of the inductor L. The cathode of the rectifier diode D connects to an anode electrode (positive electrode) of each backlight source 12. A first end of the capacitor C connects to a location between the rectifier diode D and each backlight source 12, and a second end of the capacitor C connects to the ground. A control terminal of the second controlled switch M2 connects to a second pulse width modulation signal P. The second pulse width modulation signal P is generated by the constant current driver chip 112. The power supply module 113 is used for providing power to each backlight source 12. It is worth noting that the power supply module 113 may comprise other components, and the components may also be other connection relationships. In this embodiment, the power source voltage is 24V, in other embodiments, the power source voltages can also be other voltage values. In the present embodiment, the second controlled switch M2 is a NMOS transistor, in other embodiments, the second controlled switch M2 can also be other components.

Comparing to the conventional art, the backlight driving board of the present invention controls the light emitting of the backlight sources by setting the microprocessor to generate pulse width modulation signals such that it is possible to reduce the signal lines between the backlight driving board and the liquid crystal driving hoard in order to avoid the backlight driving board from external interference because of too many signal lines, and thus be able to enhance the stability of the LCD device when operating.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A backlight driving board for driving a backlight source, comprising:

a microprocessor for receiving a display mode switching signal and a synchronization signal from a liquid crystal driving board, and generating a first pulse width modulation signal corresponding to the backlight source according to the display mode switching signal and the synchronization signal, and the backlight driving board and the liquid crystal driving board are connected to a common ground; and a constant current driver chip for controlling a duty ratio of a current flowing through the backlight source according to the first pulse width modulation signal;

wherein, the display mode switching signal is a 2D/3D switching signal;

wherein, the constant current driver chip further receives the display mode switching signal and controls a magnitude of the current flowing through the backlight source, wherein the constant current driver chip and the display mode switching signal are connected; and wherein, the constant current driver chip comprises a comparator and a first controlled switch corresponding to the backlight source, wherein, the first controlled switch is connected in series with the backlight source, a positive input terminal of the comparator is connected to the display mode switching signal, and a negative input terminal of the comparator is directly connected to a first terminal of the first controlled switch and is grounded through a resistor, an output terminal of the comparator is directly connected to a control terminal of the first controlled switch, a second terminal of the first controlled switch is directly connected to a second end of the backlight source, and the control terminal of the first controlled switch is connected to the first pulse width modulation signal, the display mode switching signal generates different voltage values in different display modes at the positive input terminal of the comparator to control the magnitude of the current flowing through the backlight source.

2. The backlight driving board according to claim 1, wherein, the backlight driving board further comprises a power supply module connected at a first end of the backlight source for providing power to the backlight source, and in a 3D display mode, a duty ratio of a current of the backlight source is fixed, and in a 2D display mode, a duty ratio of a current of the backlight source is arbitrarily adjusted.

3. A backlight driving board for driving a backlight source, comprising:

a microprocessor for receiving a display mode switching signal and a synchronization signal from a liquid crystal driving board, and generating a first pulse width modulation signal corresponding to the backlight source according to the display mode switching signal and the synchronization signal; and a constant current driver chip for controlling an operation state of the backlight source according to the first pulse width modulation signal, wherein, the constant current driver chip receives the display mode switching signal and controls a duty ration of a current flowing through the backlight source according to the first pulse width modulation signal;

wherein, the display mode switching signal is a 2D/3D switching signal;

wherein, the constant current driver chip further receives the display mode switching signal and controls a magnitude of the current flowing through the backlight source, wherein the constant current driver chip and the display mode switching signal are connected; and wherein, the constant current driver chip comprises a comparator and a first controlled switch corresponding to the backlight source, wherein the first controlled switch is connected in series with the backlight source, a positive input terminal of the comparator is connected to the display mode switching signal, and a negative input terminal of the comparator is connected to a first terminal of the first controlled switch and is grounded through a resistor, an output terminal of the comparator is connected to a control terminal of the first controlled switch, a second terminal of the first controlled switch is connected to a second end of the backlight source, and the control terminal of the first controlled switch is connected to the first pulse width modulation signal, the display mode switching signal generates different voltage values in different display modes at the positive input terminal of the comparator to control the magnitude of the current flowing through the backlight source.

4. The backlight driving board according to claim 3, wherein, the backlight driving board further comprises a power supply module connected at a first end of the backlight source for providing power to the backlight source, and in a 3D display mode, a duty ratio of a current of the backlight source is fixed, and in a 2D display mode, a duty ratio of a current of the backlight source is arbitrarily adjusted.

5. The backlight driving board according to claim 4, wherein, the power supply module includes an inductor, a second controlled switch, a rectifier diode and a capacitor, a first end of the inductor connecting to a power source voltage, a first terminal of the second controlled switch connecting to a second end of the inductor, a second terminal of the second controlled switch connecting to a ground, an anode electrode of the rectifier diode connecting to the second end of the inductor, a cathode electrode of the rectifier diode connecting to a first end of the backlight source, an end of the capacitor connecting to a location between the rectifier diode and the backlight source, the other end of the capacitor connecting to the ground, and a control terminal of the second controlled switch connects to a second pulse width modulation signal.

6. The backlight driving board according to claim 4, wherein, the backlight source is an LED string, and a positive electrode of the LED string connects to the power supply module, and a negative electrode of the LED string connects to the second terminal of the second controlled switch.

7. The backlight driving board according to claim 3, wherein, the backlight driving board and the liquid crystal driving board are formed with a common ground connection.

8. An LCD device comprising a liquid crystal driving board, a backlight source, and a backlight driving board, wherein, the backlight driving board comprises:

a microprocessor for receiving a display mode switching signal and a synchronization signal from a liquid crystal driving board, and generating a first pulse width modulation signal corresponding to the backlight source according to the display mode switching signal and the synchronization signal; and a constant current driver chip for controlling an operation state of the backlight source according to the first pulse width modulation signal, wherein, the constant current driver chip receives the display mode switching signal and controls a duty ration of a current flowing through the backlight source according to the first pulse width modulation signal;

wherein, the display mode switching signal is a 2D/3D switching signal;

wherein, the constant current driver chip further receives the display mode switching signal and controls a magnitude of the current flowing through the backlight source, wherein the constant current driver chip and the display mode switching signal are connected; and wherein, the constant current driver chip comprises a comparator and a first controlled switch corresponding to the backlight source, wherein the first controlled switch is connected in series with the backlight source, a positive input terminal of the comparator is connected to the display mode switching signal, and a negative input terminal of the comparator is connected to a first terminal of the first controlled switch and is grounded through a resistor, an output terminal of the comparator is connected to a control terminal of the first controlled switch, a second terminal of the first controlled switch is connected to a second end of the backlight source, and the control terminal of the first controlled switch is connected to the first pulse width modulation signal, the display mode switching signal generates different voltage values in different display modes at the positive input terminal of the comparator to control the magnitude of the current flowing through the backlight source.

9. The LCD device according to claim 8, wherein, the backlight driving board further comprises a power supply module connected at a first end of the backlight source for providing power to the backlight source, and in a 3D display mode, a duty ratio of a current of the backlight source is fixed, and in a 2D display mode, a duty ratio of a current of the backlight source can be arbitrarily adjusted.

10. The LCD device according to claim 9, wherein, the power supply module includes an inductor, a second controlled switch, a rectifier diode and a capacitor, a first end of the inductor connecting to a power source voltage, a first terminal of the second controlled switch connecting to a second end of the inductor, a second terminal of the second controlled switch connecting to a ground, an anode electrode of the rectifier diode connecting to the second end of the inductor, a cathode electrode of the rectifier diode connecting to a first end of the backlight source, an end of the capacitor connecting to a location between the rectifier diode and the backlight source, the other end of the capacitor connecting to the ground, and a control terminal of the second controlled switch connects to a second pulse width modulation signal.

11. The LCD device according to claim 9, wherein, the backlight source is an LED string, and a positive electrode of the LED string connects to the power supply module, and a negative electrode of the LED string connects to the second terminal of the second controlled switch.

* * * * *